US008458600B2

(12) United States Patent
Dheap et al.

(10) Patent No.: US 8,458,600 B2
(45) Date of Patent: Jun. 4, 2013

(54) DISTRIBUTED MULTI-USER MASHUP SESSION

(75) Inventors: Vijay Dheap, Durham, NC (US); Christopher Michael Gladd, Morrisville, NC (US); Aaron Charles Lindsay, Asheville, NC (US); David Preston Sink, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 12/651,072

(22) Filed: Dec. 31, 2009

(65) Prior Publication Data

US 2011/0161833 A1  Jun. 30, 2011

(51) Int. Cl.
*G06F 3/00* (2006.01)
(52) U.S. Cl.
USPC .............................. 715/751; 715/753; 715/759
(58) Field of Classification Search
USPC .. 715/744, 748, 750, 751, 753, 759; 707/740, 707/802
See application file for complete search history.

(56) References Cited

U.S. PATENT DOCUMENTS

| 8,156,441 | B1 * | 4/2012 | Bihari et al. | 715/748 |
|---|---|---|---|---|
| 2002/0065912 | A1 * | 5/2002 | Catchpole et al. | 709/224 |
| 2007/0220575 | A1 * | 9/2007 | Cooper et al. | 725/118 |
| 2008/0109483 | A1 | 5/2008 | Yoo et al. | |
| 2008/0109758 | A1 | 5/2008 | Stambaugh | |
| 2008/0215675 | A1 * | 9/2008 | Kaminitz et al. | 709/203 |
| 2009/0024632 | A1 | 1/2009 | Dheap et al. | |
| 2009/0063862 | A1 * | 3/2009 | Yun | 713/171 |
| 2009/0089225 | A1 | 4/2009 | Baier et al. | |
| 2009/0193148 | A1 | 7/2009 | Jung et al. | |
| 2009/0254745 | A1 * | 10/2009 | Ganesan | 713/151 |
| 2009/0254840 | A1 * | 10/2009 | Churchill et al. | 715/753 |
| 2009/0313562 | A1 * | 12/2009 | Appleyard et al. | 715/764 |
| 2010/0180330 | A1 * | 7/2010 | Zhu et al. | 726/10 |
| 2010/0211580 | A1 * | 8/2010 | Sreekanth | 707/756 |
| 2010/0333037 | A1 * | 12/2010 | Pavlovski et al. | 715/848 |

FOREIGN PATENT DOCUMENTS

KR  1020070009517  1/2007

OTHER PUBLICATIONS

Lee, Jong Won , English translation of Abstract KR1020070009517 http://kpa.kipris.or.kr/kpa/RC/RCKPAXML.jsp?AP-PLNO=1020060137718 (Obtained: Sep. 10, 2009) Jan. 18, 2007, 2 pages.

* cited by examiner

*Primary Examiner* — Tadeese Hailu
(74) *Attorney, Agent, or Firm* — DeLizio Gilliam, PLLC

(57) ABSTRACT

A mashup session manager maintains state of the mashup session to ensure presentation consistency/uniformity across the execution environments. The mashup session manager also tracks the participating execution environments associated with a mashup session (e.g., usernames, device identifiers, network addresses, etc.), and transmits data for presentation consistency to the participating execution environments. In some cases, a view of the mashup session at a participating execution environment may not be current ("stale mashup session view"). The mashup session manager can detect if a view at a participating execution environment is of a past mashup session state, and provide data for the stale mashup session view to become current. In addition, the mashup session manager can propagate design modifications to the participants of the mashup session.

17 Claims, 11 Drawing Sheets

DISTRIBUTED MULTI-USER MASHUP SESSION

BACKGROUND

Embodiments of the inventive subject matter generally relate to the field of mashup applications, and, more particularly, to a multi-user mashup session.

A mashup application ("mashup") is constructed with reference to two or more distinct services. The services referenced by a mashup return data in response to a request that can indicate one or more parameters. A service may be a data service or a functional service. The references to the services are wired together to meet a situational or niche need contemplated by a designer of the mashup. The mashup itself can be implemented with logic to operate upon the data returned from one or more of the services. The mashup then presents an output resulting from the returned data.

SUMMARY

Embodiments include a method directed to establishing a mashup session based, at least in part, on a mashup application and execution environments of participants of the mashup session. State data representative of at least a current view of the mashup session is maintained. Consistent views of the mashup session are maintained across the execution environments in accordance with the state data.

Embodiments include a computer program product for presenting a multi-user mashup session across execution environments. The computer program product comprises a computer readable storage medium having computer readable program code. The computer readable program code can be configured to establish a mashup session based, at least in part, on a mashup application and execution environments of participants of the mashup session. The computer readable program code can be configured to maintain state data representative of at least a current view of the mashup session. And the computer readable program code can be configured to maintain consistent views of the mashup session across the execution environments in accordance with the state data.

Embodiments include a computer program product for presenting a multi-user mashup session across execution environments. The computer program product comprises a computer readable storage medium having computer readable program code. The computer readable program code can be configured to generate a mashup session identifier for a mashup session based, at least in part on a mashup. The computer readable program code is also configured to associate a plurality of participant devices with the mashup session identifier, and establish connections with the plurality of participant devices. The computer readable program code is configured to maintain state data for the mashup session that correspond to a current view of the mashup session after a most recent action performed on the mashup during the mashup session at a first of the plurality of participant devices, and communicate an indication of the state data among the plurality of participant devices.

Embodiments include an apparatus that comprises a processing unit, a network interface, and a mashup session manager. The mashup session manager is operable to establish a mashup session based, at least in part, on a mashup application and execution environments of participants of the mashup session. The mashup session manager is also operable to maintain state data representative of at least a current view of the mashup session, and maintain consistent views of the mashup session across the execution environments in accordance with the state data.

BRIEF DESCRIPTION OF THE DRAWINGS

The present embodiments may be better understood, and numerous objects, features, and advantages made apparent to those skilled in the art by referencing the accompanying drawings.

FIG. 1A depicts a conceptual diagram of a mashup session manager managing a mashup session.

FIG. 1B depicts an example conceptual diagram of the mashup session manager maintaining consistent views across different execution environments of the participants of the mashup session.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to Web Services Description Language (WDSL) and Representational State Transfer (REST) other feed techniques and service technologies can be used (e.g., RSS, ATOM, etc.). In other instances, well-known instruction instances, protocols, structures, and techniques have not been shown in detail in order not to obfuscate the description.

A mashup can be instantiated that runs across different execution environments and allows respective users of the different execution environments to collaboratively use and/or modify the mashup instance ("mashup session"). When any one of the multiple users submits a parameter to a view of the mashup session presented on their respective execution environment, the views of the mashup session at all of the execution environments can be updated in response, although individual configurations of the execution environments can lead to variances in the views of the mashup session (e.g., colors, alerts, fonts, etc.). A mashup session manager maintains state of the mashup session to ensure presentation consistency/uniformity across the execution environments. The mashup session manager also tracks the participating execution environments associated with a mashup session (e.g., usernames, device identifiers, network addresses, etc.), and transmits data for presentation consistency to the participating execution environments. In some cases, a view of the mashup session at a participating execution environment may not be current ("stale mashup session view"). The mashup session manager can detect if a view at a participating execution environment is of a past mashup session state, and provide data for the stale mashup session view to become current. In addition, the mashup session manager can propagate design modifications to the participants of the mashup session.

Figure 1A:
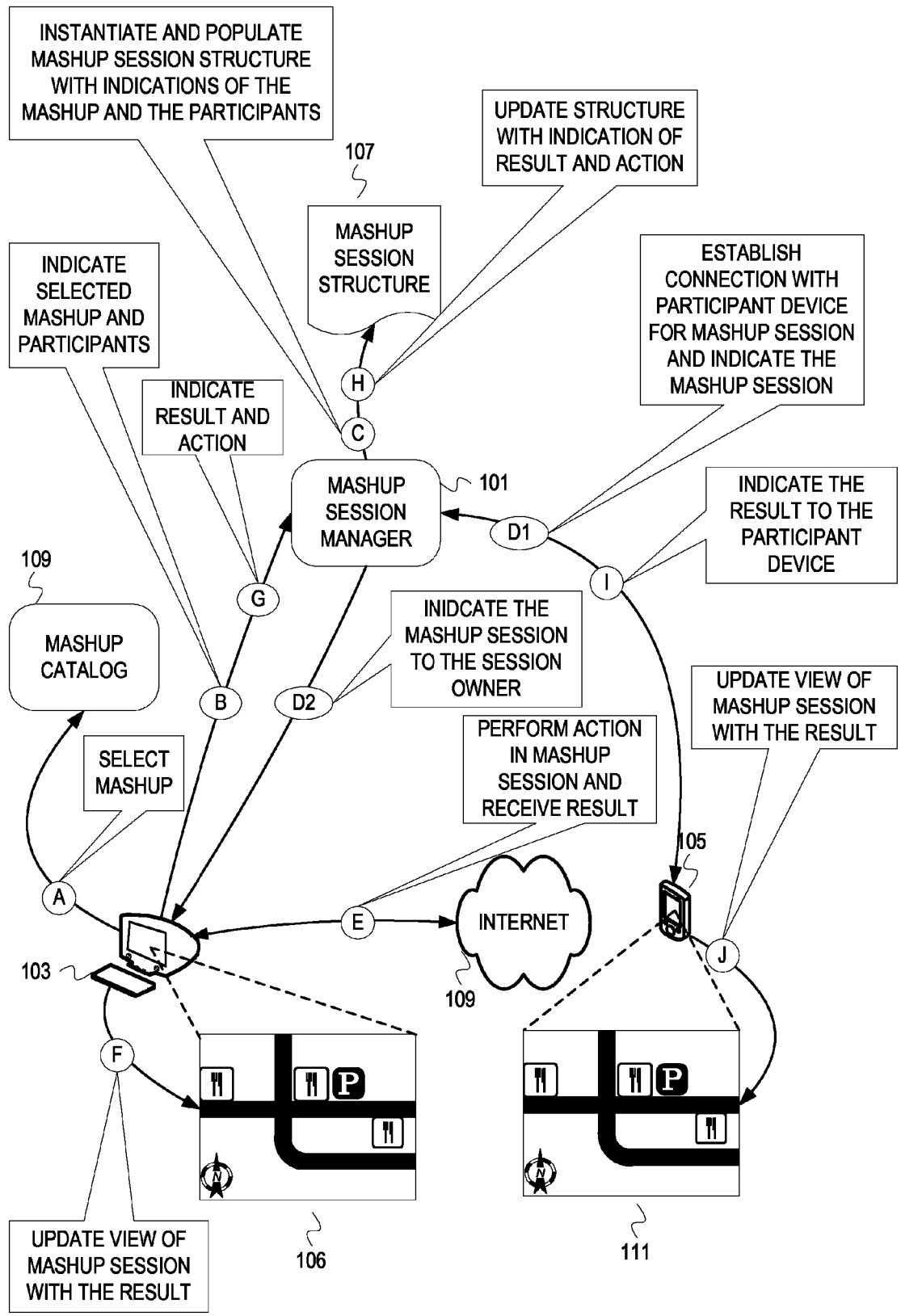
FIGS. 1A and 1B depict conceptual diagrams of consistent views of a current state of a mashup session across multiple execution environments.
Figure 1B:
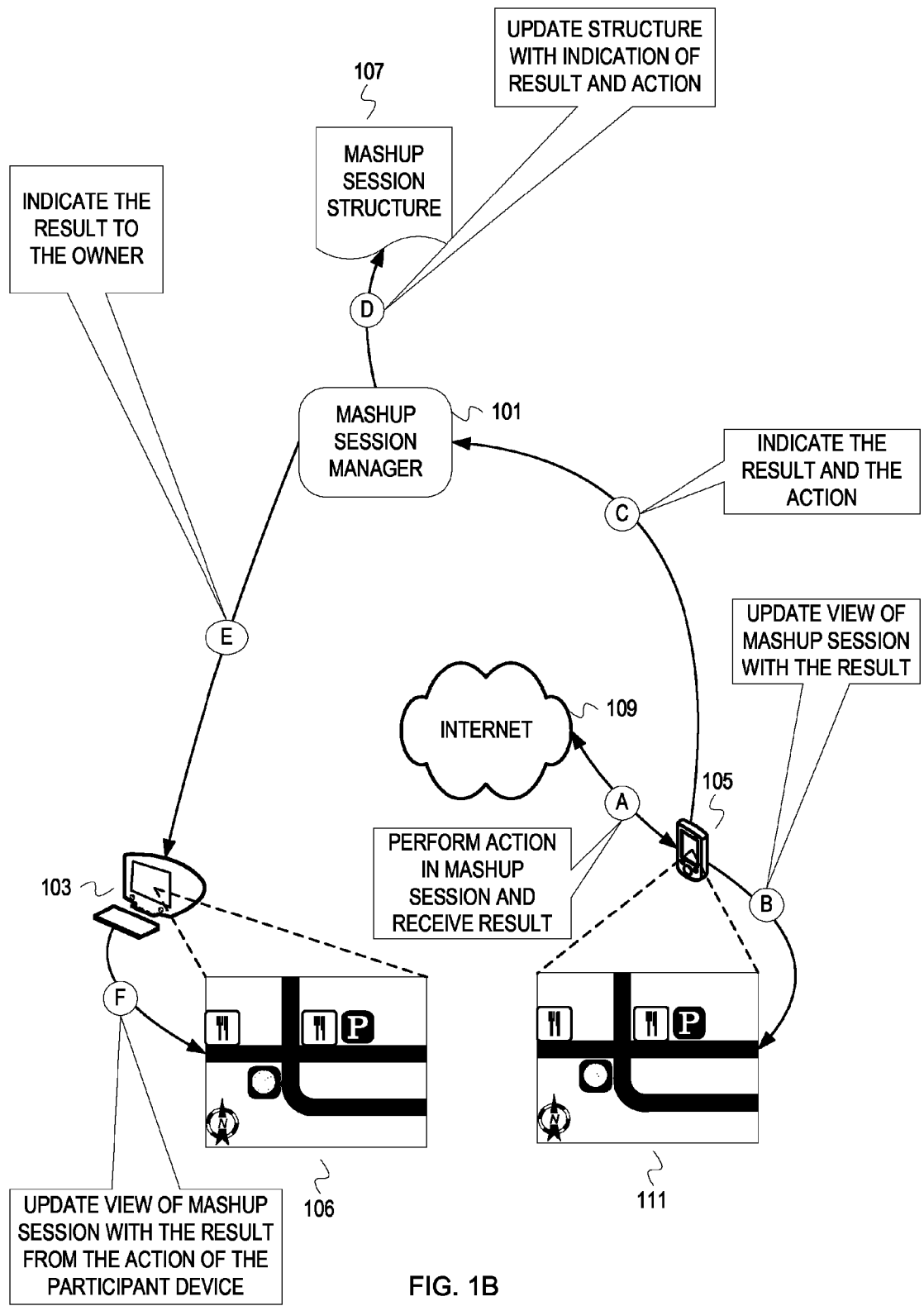

FIGS. 1A and 1B depict conceptual diagrams of consistent views of a current state of a mashup session across multiple execution environments. FIG. 1A depicts a conceptual diagram of a mashup session manager managing a mashup session. FIG. 1A depicts a mashup session manager 101 communication with devices 103, 105. The device 103 is a computer, and the device 105 is a smart phone in FIG. 1A.

At stage A, the device 103 selects a mashup application from a mashup catalog 109. The mashup catalog 109 can be stored locally or remotely with respect to the device 103. For instance, the device 103 retrieved one or more files for the selected mashup in response to the selection. Selection of the mashup may involve any one of adding functionality and/or data services to an existing mashup application, removing functionality and/or a data service from an existing mashup application, selecting multiple data services and assembling them into a mashup, etc.

At stage B, the device 103 indicates the selected mashup and one or more participants to the mashup session manager 101. The device 103 can indicate the selected mashup in accordance with a variety of techniques. For example, the device 103 can communicate any one or more of a mashup identifier, the mashup application itself, a database entry that corresponds to the mashup, etc. In addition, the device 103 can indicate participants for mashup session by device identifiers (MAC addresses, IP addresses, device serial numbers, etc.), by usernames, by telephone numbers, by e-mail addresses, etc. The device 103 may also select participants with a user interface and/or participant data associated with or accessible by the mashup session manager 101.

At stage C, the mashup session manager 101 instantiates and populates a mashup session structure 107 with indications of the mashup and the participants indicated by the device 103. The mashup session manager 101 uses the mashup session structure 107 to maintain state of the mashup session. Example data relevant to the state of the mashup session includes actions performed, requests submitted to services of the mashup, values of parameters submitted with requests, and results received in response to the actions performed. The mashup session manager c101 can use the mashup session structure to update a participant device that may have a stale view of mashup session (e.g., the participant device reconnects after losing connection, the participant device connects after the session begins, etc.).

Figure 9:
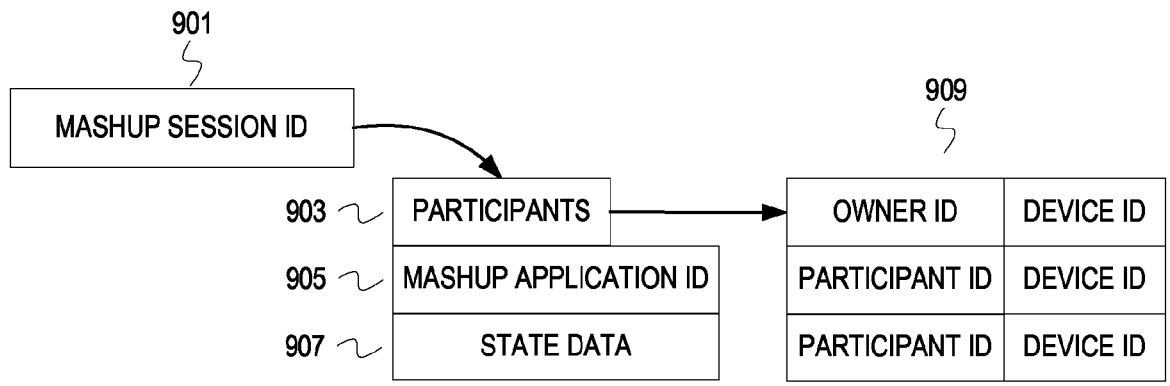
FIG. 9 depicts an example mashup session structure.

FIG. 9 depicts an example mashup session structure. The depicted mashup session structure can be a standalone structure or an entry or part of another structure (e.g., entry in a hash table, element of a tree, etc.). The example mashup session structure includes a mashup session identifier field 901. The mashup session identifier field manager one indicates a value that identifies a corresponding mashup session. The mashup session manager or some other process can generate the mashup session identifier in accordance with a variety of techniques. For example, the mashup session manager can generate the mashup session and a log of a fire based upon a hash of an identifier of the owner and identifier of the corresponding mashup application.

The mashup session identifier field identifier references a substructure that includes a participants field 903, a mashup application identifier field 905, and a state data field 907. The mashup application identifier field 905 indicates a mashup application identifier. The state data field 907 indicates at least a most recent result for the mashup session. The state data field 907 can indicate a default of actions, a log of requests submitted to the services of the mashup, deltas of results, history of results, result history within a window of time, etc.

The participants field 903 references a substructure 909. The substructure 909 (e.g., an array, list, a tree, etc.) identifies an order of the mashup session and participants of the mashup session. The substructure 909 also identifies devices associated with the owner and participants.

The mashup session manager 101 can also edit an entry of an existing structure. For instance, a mashup session manager may be responsible for several ongoing mashup sessions, and manage them with one structure. The mashup session manager 101 could add an entry to this structure, overwrite an entry that already exists in this structure, etc. A mashup session manager may maintain a mashup session structure for all ongoing mashup sessions managed by the mashup session manager, a mashup session structure for each owner/creator, a mashup session structure for each individual session, etc.

After the mashup session structure 107 is instantiated and populated, the mashup session manager 101 communicates with the device 103 and the device 105. The communications can take place in any order and are represented by stages D1 and D2 in FIG. 1A. At stage D1, the mashup session manager 101 establishes a connection with the participant device 105 for the mashup session. The mashup session manager 101 indicates the mashup session to the participant device 105. The mashup session manager 101 establishes the connection with the device 105 using participant information previously indicated by the device 103 at stage B. Establishing the connection between the mashup session manager 101 and the device 105 may involve setting up a channel, setting up a communication session, authentication and verification operations, handshake operations, etc. Establishing the connection can also involve the mashup session manager 101 querying the device 105 for execution environment for the connection (e.g., formatting information, encoding information, software version information, etc.). The mashup session manager 101 may encapsulate, encode, and/or reformat data when communicating with the device 105. To indicate the mashup session to the device 105, the mashup session manager 101 can supply a reference or data fire of the mashup session structure 107. The device 105 can access the mashup session structure 107 to retrieve the mashup application. The mashup session manager 101 can also or alternatively supply the mashup to the device 105 as well as an identifier or reference to the mashup session structure 107. At stage D2, the mashup session manager 101 indicates the mashup session to the session owner that corresponds to the device 103. For example, the mashup session manager 101 transmits data that can comprise a memory address of the mashup session structure 107, an identifier of the mashup session structure 107, an identifier of the mashup session structure 107 and an index into the mashup session structure 107, etc.

At stage E, the device 103 performs an action in the mashup session and receives a corresponding result from the Internet 109.

At stage F, the device 103 updates a view 106 of the mashup session with the received result. FIG. 1A depicts the device 103 updating a map mashup. The view 106 illustrates a map with three restaurant locations and a public parking area nearest one of the restaurant locations that is near an intersection. As an example, the device 103 may have performed an action in the mashup session to map restaurants that are near the participants using the devices 103, 105 and that satisfy cuisine criteria indicated profiles of the participants.

At stage G, the device 103 indicates the received result and the performed action to the mashup session manager 101. For instance, device 103 indicates a request generated from the mashup that corresponds to the action performed at stage E to the mashup session manager 101 and the responsive data. Embodiments do not necessarily communicate indications of both the received result and the performed action. Embodiments can communicate one of the received result and the performed action to the mashup session manager 101.

At stage H, the mashup session manager 101 updates the mashup session structure 107 with indications of the result and the action, thus reflecting state of the mashup session in the mashup session structure 107. The mashup session manager 101 can maintain a history of actions performed during the mashup session in the mashup session structure 107. The history can be comprehensive or limited by a window of time. The mashup session manager 101 can indicate in the mashup session structure 107 each result of each performed action, a most current result, a last N results, a delta of a current result and a previous result, etc.

At stage I, the mashup session manager 101 indicates the result to the participant device 105. The mashup session manager 101 can also provide performed action to the participant device 105. The participant device 105 can automatically perform the performed action to obtain a current view of the mashup session. The participant device 105 can compare the results of device 105 receives from the Internet 109 against the result indicated from the mashup session manager 101. Any differences can be communicated back to the mashup session manager 101 for validation and/or propagation to other participants of the mashup session.

At stage J, the participant device 105 updates a view 111 of the mashup session with the result indicated by the mashup session manager 101. The views 106, 111 of the mashup session at the respective devices 103, 105 are consistent across the different execution environments of the participants.

FIG. 1B depicts an example conceptual diagram of the mashup session manager maintaining consistent views across different execution environments of the participants of the mashup session. At stage A, the participant device 105 performs an action in the mashup session and receives a corresponding result from the Internet 109. At stage B., the participant device 105 updates the view 111 of the mashup session with the received result. In FIG. 1B, the participant device 105 has updated the view 111 to depict a volleyball field at the intersection of roads, and to no longer depict one of the previously depicted restaurants. As an example, the participant device 105 may have performed an action in the mashup session that requested indication of recreational facilities near the restaurants already displayed, and an action in the mashup session that added a cost criterion. The eliminated restaurant exceeded, or perhaps fell below, the cost criterion indicated by the participant device 105.

At stage C., the participant device 105 indicates the result in the action to the mashup session manager 101.

At stage D., the mashup session manager 101 updates the mashup session structure 107 in accordance with the action and the result indicated by the participant device 105.

At stage E, the mashup session manager 101 indicates the result to the owner of the mashup session, which is the device 103. As stated earlier, the mashup session manager 101 can also indicate the result to the device 103.

At stage F, the device 103 updates the view 106 in accordance with the result indicated by the mashup session manager 101. Alternatively, the device 103 can obtain the result from the Internet 109 by performing the action indicated by the participant device 105. Although the example depicted by FIGS. 1A and 1B refer to obtaining results from the Internet, embodiments are not so limited. Embodiments can obtain results from any one or more of an intranet, virtual private network, and the Internet.

Although FIGS. 1A and 1B depict the mashup session manager 101 as being separate from the device 103 that initiated the mashup session, embodiments are not so limited. The mashup session manager 101 can be implemented at an intermediate device (e.g., a cloud, server, etc.), on the device 103, distribute across device 103 an intermediate device, etc. hence, communications that seemingly flow through the mashup session manager 101 may be direct communications between the device 103, which initiated the mashup session, and devices of participants of the mashup session. In addition, communications for the mashup session that flow directly between participant devices can be mirrored to an intermediate device or entity (e.g., cloud that supports the mashup session). Embodiments may also interject a mashup session manager between an initiating device and/or participant devices and the Internet. For example, actions performed at a participant device are submitted to the mashup session manager which generates the corresponding requests and submits or causes to be submitted the requests to the appropriate data service. Embodiments can direct mashup actions and responses to the mashup actions through a mashup session manager and/or processes spawned by or associated with the mashup session manager. Embodiments can instantiate/supply user interfaces to the participant devices that forward actions and corresponding parameter values indicated with the user interfaces to the mashup session manager. The mashup session manager can then submit the actions and corresponding parameter values to the mashup application. The mashup session manager can broadcast or multicast results of the submitted actions to all participants of the mashup session. In addition, the mashup session manger can perform operations to manage collisions among the execution environments. For example, embodiments can sequence and/or prioritize actions, which impact state of the mashup session, performed at the execution environments.

Figure 2:
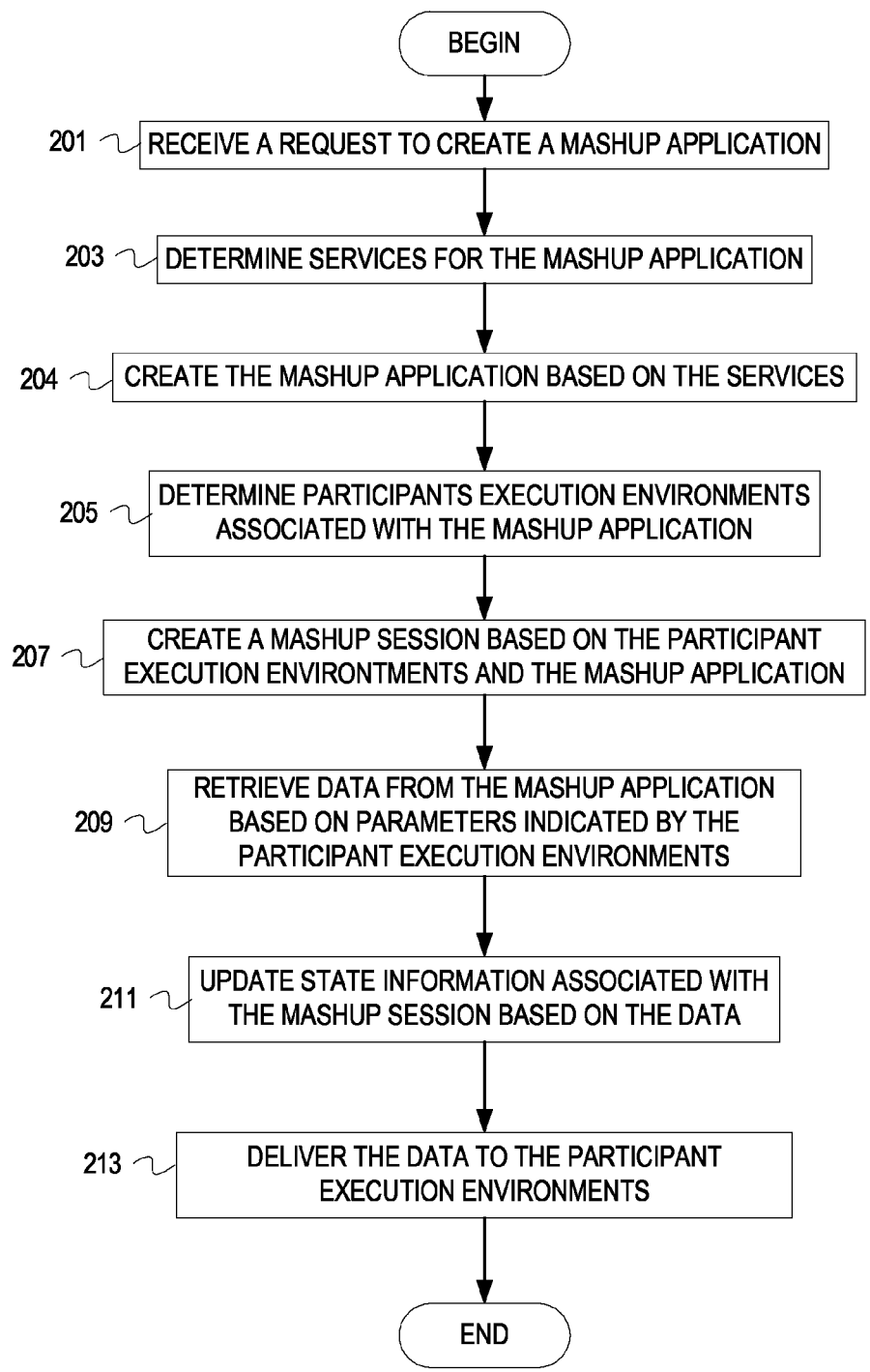
FIG. 2 depicts a flowchart of example operations for creating a mashup session that can be shared across multiple execution environments.

FIG. 2 depicts a flowchart of example operations for creating a mashup session that can be shared across multiple execution environments. A request to create a mashup application is received (201) from an execution environment. The request can indicate services to for the mashup application according to a need contemplated by a designer of the mashup application. The designer of the mashup application can be associated with the execution environment.

Services for the mashup application are determined (203). Services can be data sources, can provide functionality, or both. Examples of data source type services include weather databases, business directories, and restaurant review aggregators. Examples of functionally type services include database managers, map applications, and traffic reporting applications. Functionality can be implemented in servlets, applets, applications, etc. The services can be provided by a mashup session manager, a third-party, or a combination thereof. For example, a mashup session manager can determine the services based on the request. As another example, the mashup session manager can determine the services by querying the execution environment requesting creation of the mashup. The mashup session manager can provide an indication of the available services to the execution environment. The indication of available services can include descriptions of the services that help designers choose appropriate services for mashup applications the designers wish to create. In response, the execution environment can display the available services and can prompt the designer to select services for the mashup application.

The mashup application is created based on the services (204). The services can be wired together based on indications of the designer. For example, the purpose of the mashup application can be finding restaurants convenient to the locations of several individuals. The services selected for the mashup are a restaurant database and a map application. Both the restaurant database and the map application expect locations as inputs. Locations can be represented by global positioning system (GPS) coordinates, addresses, intersections, etc. The designer indicates that restaurants should be retrieved from the restaurant database based on locations that can be provided as inputs to the mashup application. Addresses of the restaurants output by the restaurant database and the provided locations should be input into the map application so that the map application can create a map of the provided locations and the restaurants.

Participant execution environments associated with the mashup application are determined (205). For example, the mashup session manager can determine the participant execution environments based on identifiers indicated in the request. As another example, the mashup session manager can determine the participant execution environments by querying the designer's execution environment. The mashup session manager can provide an indication of users known to the mashup session manager. The users may be known to the mashup session manager because the users registered the users' execution environments with the mashup session manager, the users' execution environments were previously associated with a mashup application, etc. In response, the designer' execution environment can display the known users and can prompt the designer to select participants to associate with the mashup application. The designer can select participants from the known users or can identify other users by providing contact information of the other users (e.g., an e-mail address, a phone number, an instant messaging username, etc). The designer's execution environment is automatically considered to be a participant execution environment.

A mashup session can be created based on the participant execution environments and the mashup application (207). Establishing the mashup session can comprise generating a mashup session identifier and populating a mashup session state structure with data that associates the mashup application with the mashup session identifier and the participant execution environments. The mashup session structure can be populated with the mashup session identifier, an indication of the mashup application, and indications of the participant execution environments. Examples of the indication of the mashup application include a name, a reference (e.g., a link to code, a memory address (i.e., pointer) to the code), code hash value, the mashup application itself, etc. Examples of indications of the participant execution environments include usernames, device identifiers (e.g., MAC addresses, phone numbers, etc.), network addresses, etc.

Data is retrieved from the mashup application based on parameters indicated by the participant execution environments (209). In the previous example of the convenient restaurant locator mashup, a mashup session manager determines the locations of each of the participant execution environments. The mashup session manager can determine the locations by querying the execution environments. The execution environments can automatically determine and return the parameters based on stored data (e.g., a GPS coordinate of a mobile phone). The devices can also prompt participants associated with the execution environments to enter the attributes. The mashup session manager can also determine parameters based on previously stored data accessible to the mashup session manager. For example, parameters can be stored by the mashup session manager when a user registers the users' execution environment with the mashup session manager. The mashup session manager can provide locations to the mashup as inputs. The mashup application can retrieve a list of restaurants from the restaurant database and utilize the map application to generate a map of the restaurants and the locations of the participant execution environments.

State information associated with the mashup session can be updated based on the data (block 211). The data can be stored in the state information associated with the mashup session identifier in the mashup session structure. The request can be stored with the data in the state information to maintain a history of requests and data generated by the mashup application in response to the requests.

The data is delivered to the participant execution environments (213). The data can be delivered in accordance with state information to ensure presentation consistency across the participant execution environments. Individual state information associated with each of the participant execution environments with respect to the mashup application can be maintained. The individual state information indicates a last state of the data that was viewed on a participant execution environment. The mashup session manager 101 can deliver data generated by the mashup application to the participant execution environment since the last state. The data can be delivered to the participants by a REST web service.

Figure 3:
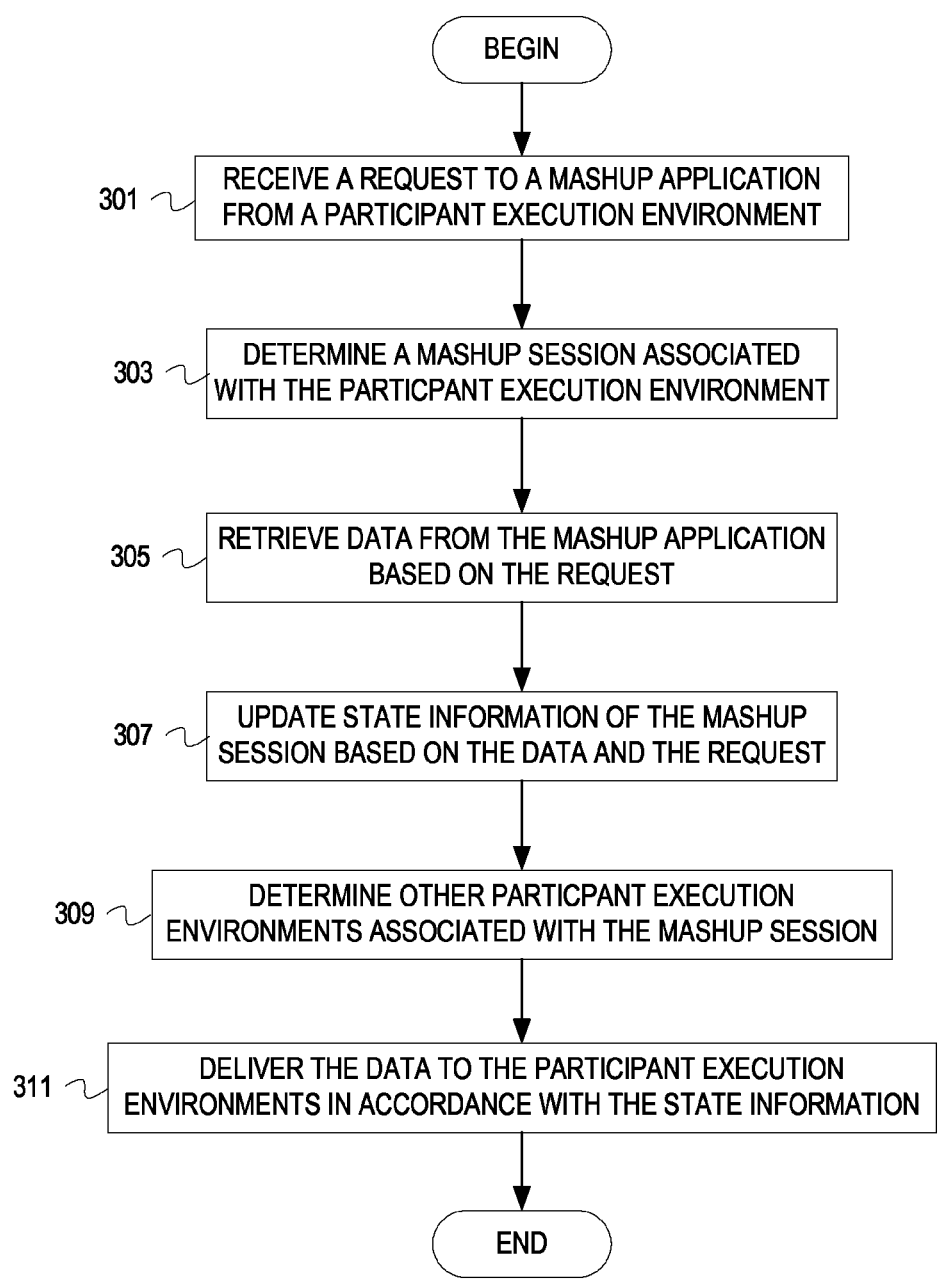
FIG. 3 depicts a flowchart of example operations for updating mashup session state information based on data generated by a mashup application and delivering the data to multiple participant execution environments.

After a mashup session is established, requests made to a mashup application associated with the mashup session cause the mashup application to generate new data. FIG. 3 depicts a flowchart of example operations for updating mashup session state information based on data generated by a mashup application and delivering the data to multiple participant execution environments. A request to a mashup application is received from a participant execution environment (301). For example, a mashup session manager receives a request to add a new service to the mashup application. As another example, the mashup session manager receives a request to associate a new participant execution environment with the mashup application.

A mashup session associated with the participant execution environment is determined (303). The mashup session can be determined based on locating an identifier of the participant execution environment in a mashup session structure and determining a mashup session identifier associated with the participant execution environment identifier. A mashup application associated with the mashup session identifier can also be determined.

Data is retrieved from the mashup application based on the request (305). For example, the request comprises an indication of a new execution environment to participate in the mashup session. So, the mashup session manager determines a location of the new execution environment and provides the location as an input along with locations of other participant execution environments to a restaurant locator mashup application. The locations of other participant execution environments can be determined based on state data of a previous request submitted to the mashup application. The mashup application retrieves a new set of restaurants from a restaurant database based on the locations and utilizes a map application to create a new map of the locations and the restaurants.

State information of the mashup is updated based on the data and the request (307). State information can be stored in the mashup session structure based on the mashup session identifier. The state information can maintain a history of requests and data generated by the mashup application in response to the requests.

Other participant execution environments associated with the mashup session are determined (309). The other participant execution environments can be determined based on state information of the mashup session.

Data is delivered to the participant execution environments in accordance with the state information (311). Delivering the data to the participant execution environments can comprise determining that a state of a first participant execution environment corresponds to a past state of the mashup session and determining data generated by the mashup application since the past state of the mashup session based individual state information corresponding to the first participant execution environment in the mashup session structure. The data generated by the mashup application since the past state can be transmitted to the first participant execution environment to update a view of the mashup session associated with the first execution environment to the current state. For example, a Webpage representing the data is open in a browser of the first execution environment. A mashup session manager determines that the browser last loaded the Webpage prior to the latest request based on the individual state information. The mashup session manager can transmit an indication to the browser to cause the browser to refresh the Webpage.

Figure 4:
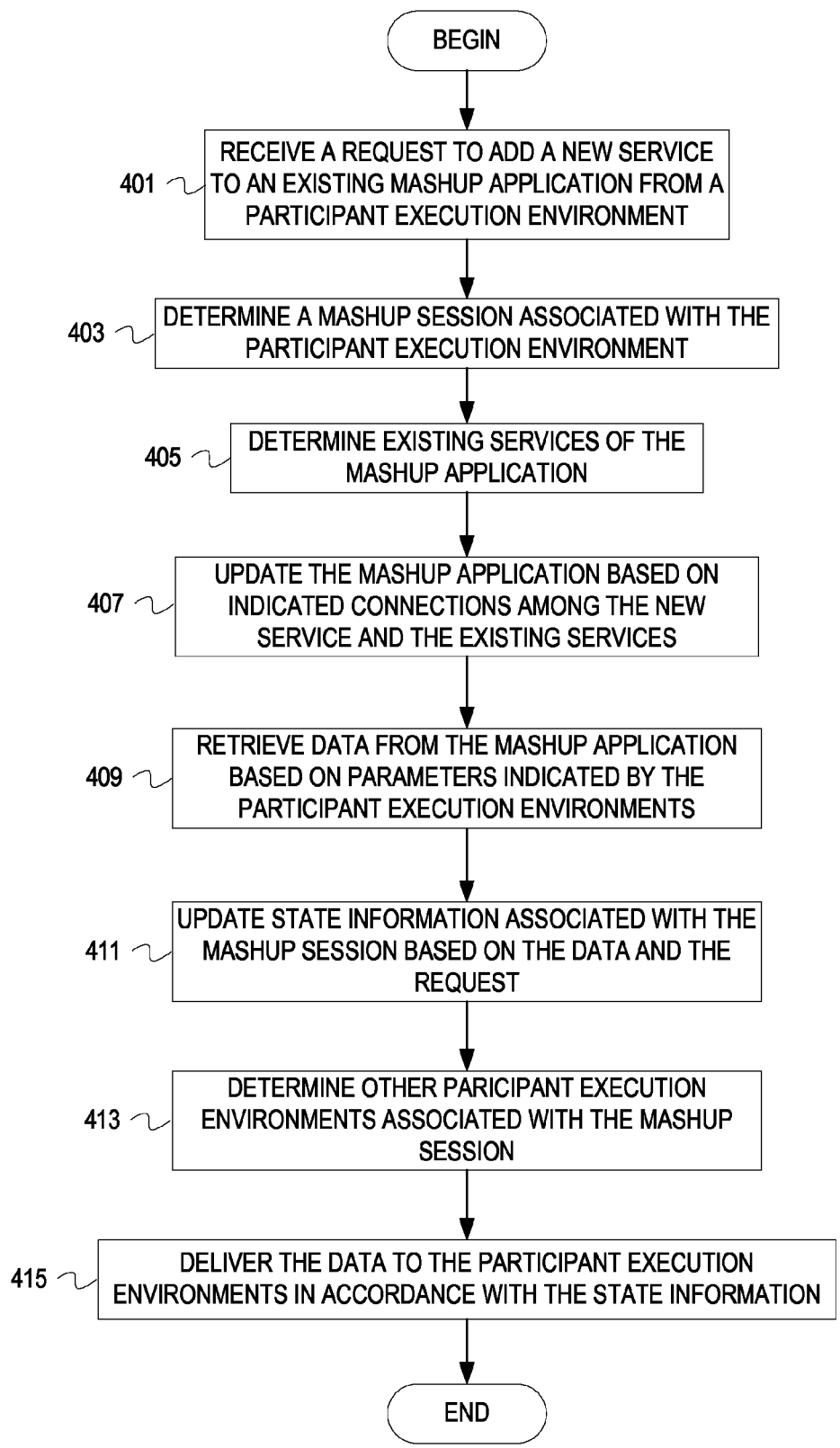
FIG. 4 depicts a flowchart of example operations for adding services to an existing mashup application.

After a mashup application is created, any of the participants associated with the mashup can add services to the mashup. In response to a mashup session manager adding the service to the mashup application, the mashup application can generate new data. The mashup session manager can automatically update state information to reflect the data and deliver the data to the participant execution environments associated with the mashup application. FIG. 4 depicts a flowchart of example operations for adding services to an existing mashup application. A request to add a service is received from a participant execution environment (401). For example, a mashup session manager receives a request indicating a new service to be added to an existing mashup application.

A mashup session associated with the participant execution environments is determined (403). The mashup session manager can determine the mashup application based on state information for a mashup session associated with the participant execution environment.

Existing services of the mashup application are determined (block 405). For example, a mashup session manager determines the existing services of the mashup based on metadata of the mashup application.

The mashup application is updated based on indicated connections among the new service and existing services (407). For example, a user may wish to add a restaurant review aggregator to the convenient restaurant locator mashup. The mashup session manager determines that a connection should be made between an output of the restaurant database to the restaurant review aggregator such that restaurant identifiers (e.g., restaurant names, addresses, phone numbers, etc.) can be input into the restaurant review aggregator to retrieve reviews.

Data is retrieved from the mashup application based on parameters indicated by the participant execution environments (409). For example, a calendar application may be added to a mashup application for scheduling business lunches. A query containing the locations and calendar identifiers of the participant execution environments can be submitted to the business lunch scheduler mashup application. In response, the mashup application can retrieve information about each participant's free time from the calendar application based on an identifier for each participant's calendar. In addition to retrieving data from the additional service, the mashup can retrieve data from the existing services if the attributes have changed. For example, a map of the restaurants may be updated if one or more of the participants' locations changed.

State information associated with the mashup session is updated based on the data and the request (411).

Other participant execution environments associated with the mashup are determined (413). The participant execution environments can be determined based on state information of the mashup session.

Data is delivered to the participant execution environments in accordance with the state information (415). For example, one of the participants opens a view of the data. Individual state information for the participant can indicate that the participant last viewed the data when a previous request was submitted to the mashup application. A mashup session manager can determine data that was generated by the mashup in response to the previous request and the current request and deliver the data to the participant through the participant execution environments.

Figure 5:
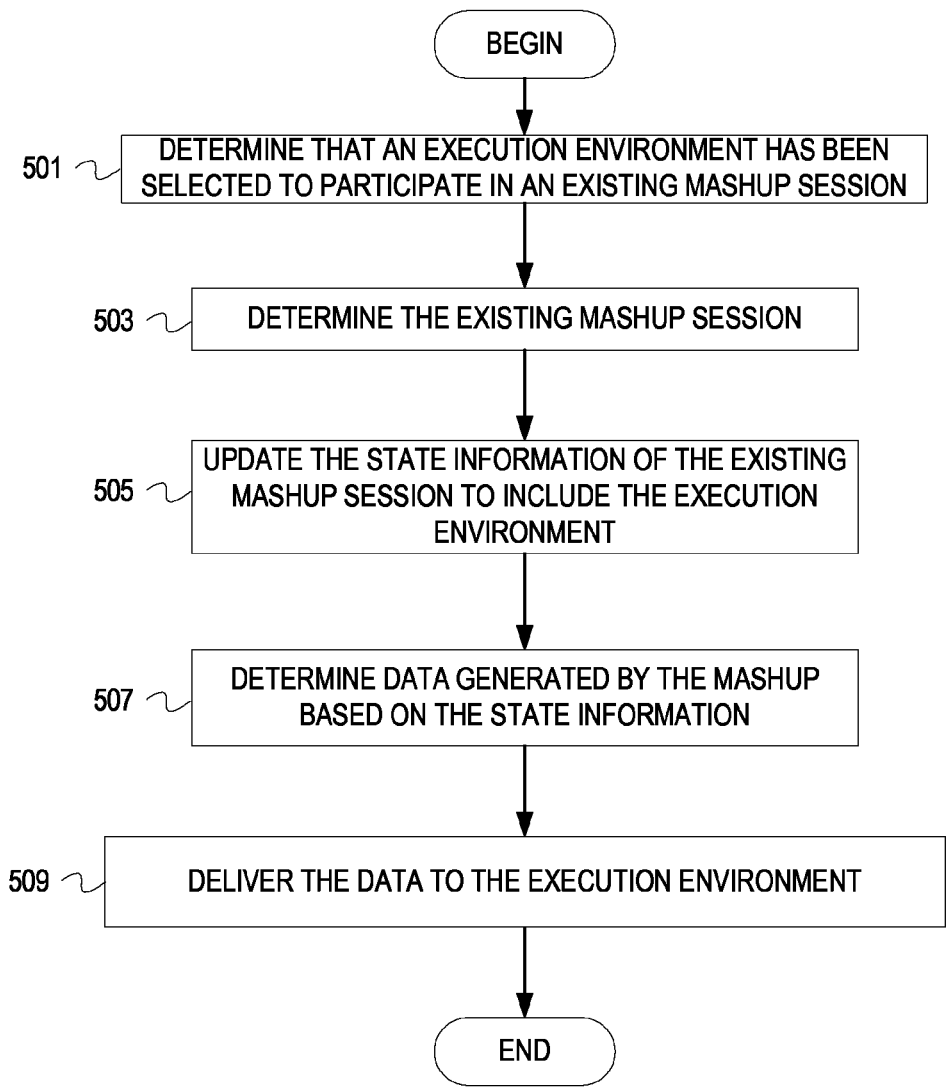
FIG. 5 depicts a flowchart of example operations for adding participant execution environments to an existing mashup session.

After a mashup session is created, new execution environments can also be selected to participate in the mashup session. For example, a participant wishes to invite more colleagues to a lunch meeting. FIG. 5 depicts a flowchart of example operations for adding participant execution environments to an existing mashup session. It is determined that an execution environment has been selected to participate in an existing mashup session (501). For example, a mashup session manager receives a request identifying the execution environment to be added as a participant in the existing mashup session. The participant execution environment can be identified based on contact information of a user associated with the participant execution environment such as an e-mail address, a phone number, instant messaging username, etc. The request can include an identifier of the existing mashup session so the mashup session manager adds the participant execution environment to the appropriate mashup session.

The existing mashup session is determined (403). For example, the existing mashup session is determined based on an identifier in the request.

Data generated by the mashup is determined based on the state information (507). The execution device has never accessed a view of the data, so a mashup session manager can determine data that was generated by the mashup since the mashup was created.

The data is delivered to the execution environment (509).

Figure 6:
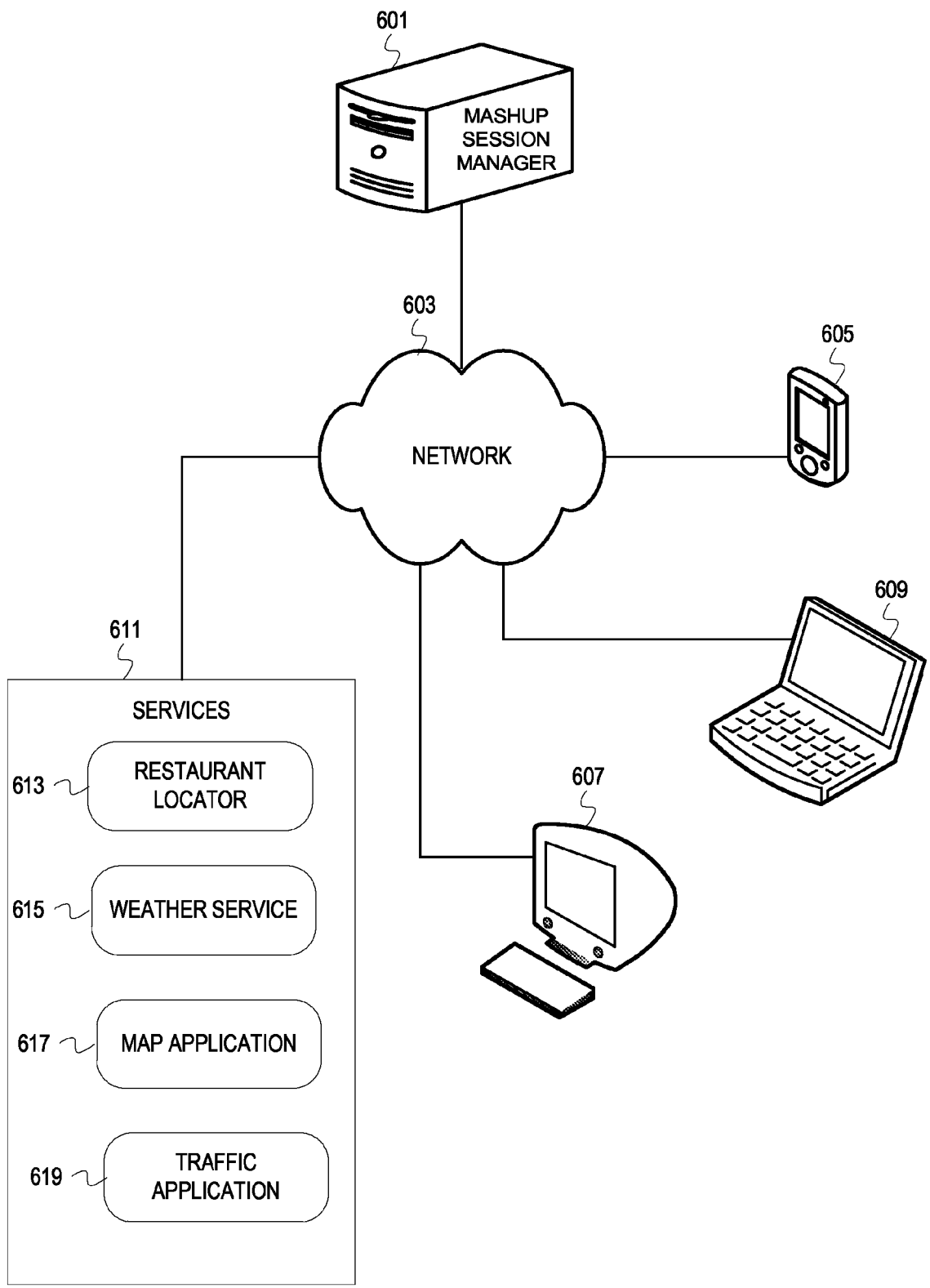
FIG. 6 is an example conceptual diagram of a network for delivering data generated by mashup applications to participant execution environments.

FIG. 6 is an example conceptual diagram of a network for delivering data generated by mashup applications to participant execution environments. A mobile phone 605, a laptop computer 609, and a desktop computer 607 are connected to a mashup session manager 601 through a network 603. The mobile phone 605, the laptop computer 609, and the desktop computer 607 represent user devices registered with the mashup session manager 601. Although not shown, other user devices such as PDAs and portable music players can be connected to the mashup session manager 601 through the network 603.

The mashup session manager 601 is connected to various services 611 through the network 603. The services can comprise data sources and functionality. In this example, the services 611 comprise a restaurant locator 613, a weather service 615, a map application 617, and a traffic application 619. Other examples of services include business directories, movie listings, calendar applications, etc. In this example, the services 611 are hosted on third-party servers (not shown). In other examples, some (or all) of the services 611 can be hosted on the mashup session manager 601.

The mashup session manager 601 receives requests to create mashup applications from the mobile phone 605, the laptop computer 609, and the desktop computer 607, and creates the mashup applications based on selected services. The mashup session manager 601 associates participant execution environments and a mashup application with a mashup session. The mashup session manager retrieves data from the mashup application based on parameters indicated by the participant execution environments, updates state information of the mashup session to reflect the data, and distributes the data the participant execution environments in accordance with the state information. For example, the mashup session manager 601 can receive a request for creating a mashup application for responding to natural disasters from the desktop computer 607. The mashup session manager 601 can determine that the weather service 615, the map application 617, and the traffic application 619 constitute services specified for the mashup. The mashup session manager 601 can also determine that the laptop computer 609, the mobile phone 605, and the desktop computer 607 have been selected as participant execution devices associated with a mashup session. The mashup session manager 601 can retrieve weather information from the weather service 615. When a natural disaster hits, the mashup session manager 601 can utilize information reported by the weather service 615 to create a map, using the map application 617, of the natural disaster's location and impose the locations of the participants on the map. The mashup session manager can integrate traffic information from the traffic application 619 with the map to determine routes for each participant. The mashup session manager 601 compiles the data generated by the mashup application comprising the natural disaster information from the weather service 615, the map and traffic information and updates state information of the mashup session based on the data and distributes the data to the mobile phone 605, the laptop computer 609, and the desktop computer 607 so that the participants associated with the mobile phone 605, the laptop computer 609, and the desktop computer 607 can respond to the natural disaster.

Although examples refer to a stand-alone mashup session manager, embodiments are not so limited. For example, functionality of the mashup session manager can be implemented on a participant execution environment.

Figure 7:
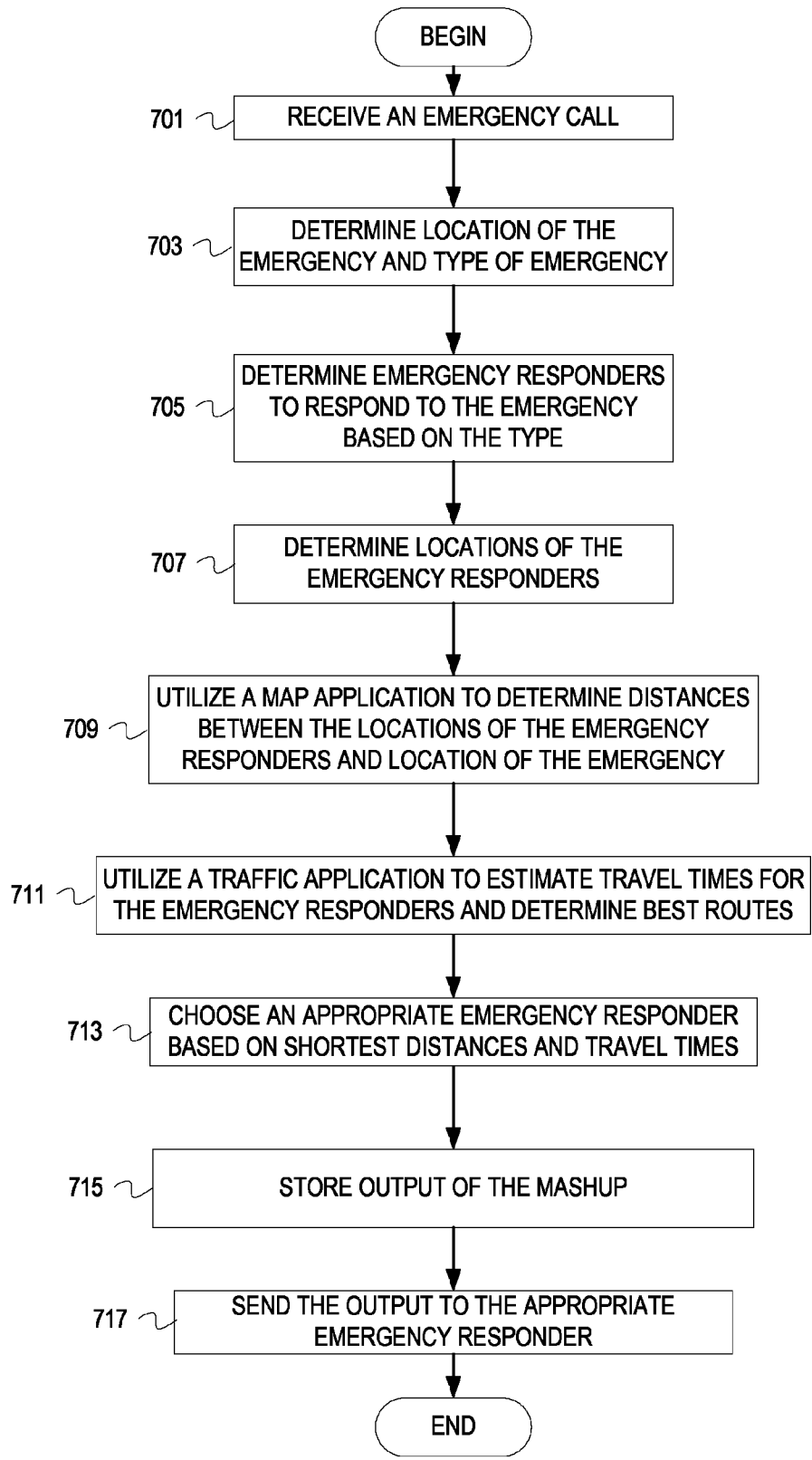
FIG. 7 depicts a flowchart of example operations for dispatching an appropriate emergency responder using a distributed mashup.

A distributed mashup can be created to dispatch appropriate emergency response personnel to an emergency. Services such as a map application, a traffic application, and an emergency database, can be added to the distributed mashup. Emergency responders can be selected participate in the mashup based on identification of the emergency responders' execution environments (e.g., laptop computer in response vehicles, mobile phones, navigation units in the response vehicles, etc.). FIG. 7 depicts a flowchart of example operations for dispatching an appropriate emergency responder using a distributed mashup. An emergency call is received (block 701). For example, an emergency is reported to a 911 dispatch center. A 911 operator can input information about the emergency (e.g., location, type, etc.) into an emergency database.

A mashup session manager can detect that a new emergency has been added to the emergency database and determine the location of the emergency and type of emergency (block 703) based on information in the emergency database.

Emergency responders to respond to the emergency are determined based on the type (block 705). For example, firefighters should respond to a fire emergency. As another example, police officers and emergency medical technicians should respond to a car accident.

Locations of the emergency responders are determined (block 707). For example, the mashup session manager queries the emergency responders' devices to determine GPS coordinates of the emergency responders.

A map application can be utilized to determine distances between the locations of the emergency responders and the location of the emergency (block 709).

A traffic application can be utilized to estimate travel times for the emergency responders and determine best routes (711). For example, traffic information can be imposed on the map so that the map application can determine the best routes.

An appropriate emergency responder is chosen based on the shortest distances and travel times (block 713). Availability of the emergency responders can also be used to determine the appropriate emergency responder. For example, an emergency responder who has already been dispatched to a previous emergency is not chosen as the appropriate emergency responder.

The output of the mashup is stored (block 715). In this example, the output comprises the type and location of the emergency and the best route.

The output is sent to the appropriate emergency responder (block 771) to dispatch the emergency responder. Although the output is sent to the appropriate emergency responder, the output can be distributed to other emergency responders because the appropriate emergency responder may need backup or may not be able to respond due to external factors (e.g., an increase in traffic along the best route).

Embodiments are not limited to the example flowcharts depicted in the above figures. Embodiments can perform additional operations, fewer operations, operations in parallel, etc. For instance, referring to FIG. 2, operations for creating a mashup based on the participant execution environments and retrieving data from the mashup application can be performed in parallel. Referring to FIG. 5, the operations for determining existing services of the mashup application and determining other participant execution environments can be performed in parallel.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
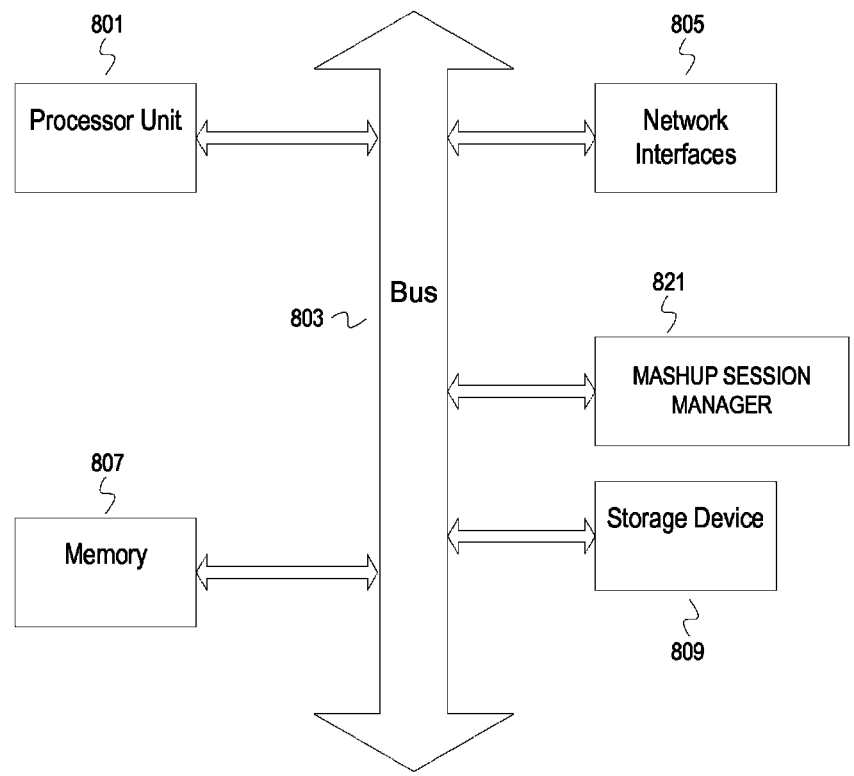
FIG. 8 depicts an example computer system.

FIG. 8 depicts an example computer system. The computer system can act as a mashup session manager. A computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI bus, ISA bus, PCI-Express bus, HyperTransport® bus, InfiniBand® bus, NuBus bus, etc.), a network interface 805 (e.g., an ATM interface, an Ethernet interface, a Frame Relay interface, SONET interface, wireless interface, etc.), and a storage device(s) 809 (e.g., optical storage, magnetic storage, etc.). The computer system also includes a mashup session manager 821. The mashup session manager 821 can determine participant execution environments associated with a mashup application and establish a mashup session based on the mashup application and the participant execution environments. The mashup session manger 821 can also create a mashup session structure to main state of the mashup session and ensure consistent, current views of the mashup session. The mashup session manager 821 can deliver data generated by the mashup application to the participant execution environments in accordance with the state information to ensure presentation consistency across the participant execution environments. Any one of these functionalities may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 809, and the network interface 805 are coupled to the bus 803. Although illustrated as being coupled to the bus 803, the memory 807 may be coupled to the processor unit 801.

As stated earlier, participants of a mashup session can modify the mashup. Although a consistent view can be maintained across participant devices, participants may choose to modify the mashup for their own purposes without synchronizing the changes to the other participant devices. Hence, the various participants can asynchronously interact with the mashup in the mashup session. Although the interactions would be asynchronous and the views vary, the mashup session manager maintains a global perspective of the mashup session. Thus, participants can asynchronously collaborate with the mashup, and be aware of other participant's interactions with the mashup without necessarily being confined to a uniform, global view of the mashup session.

Figure 10:
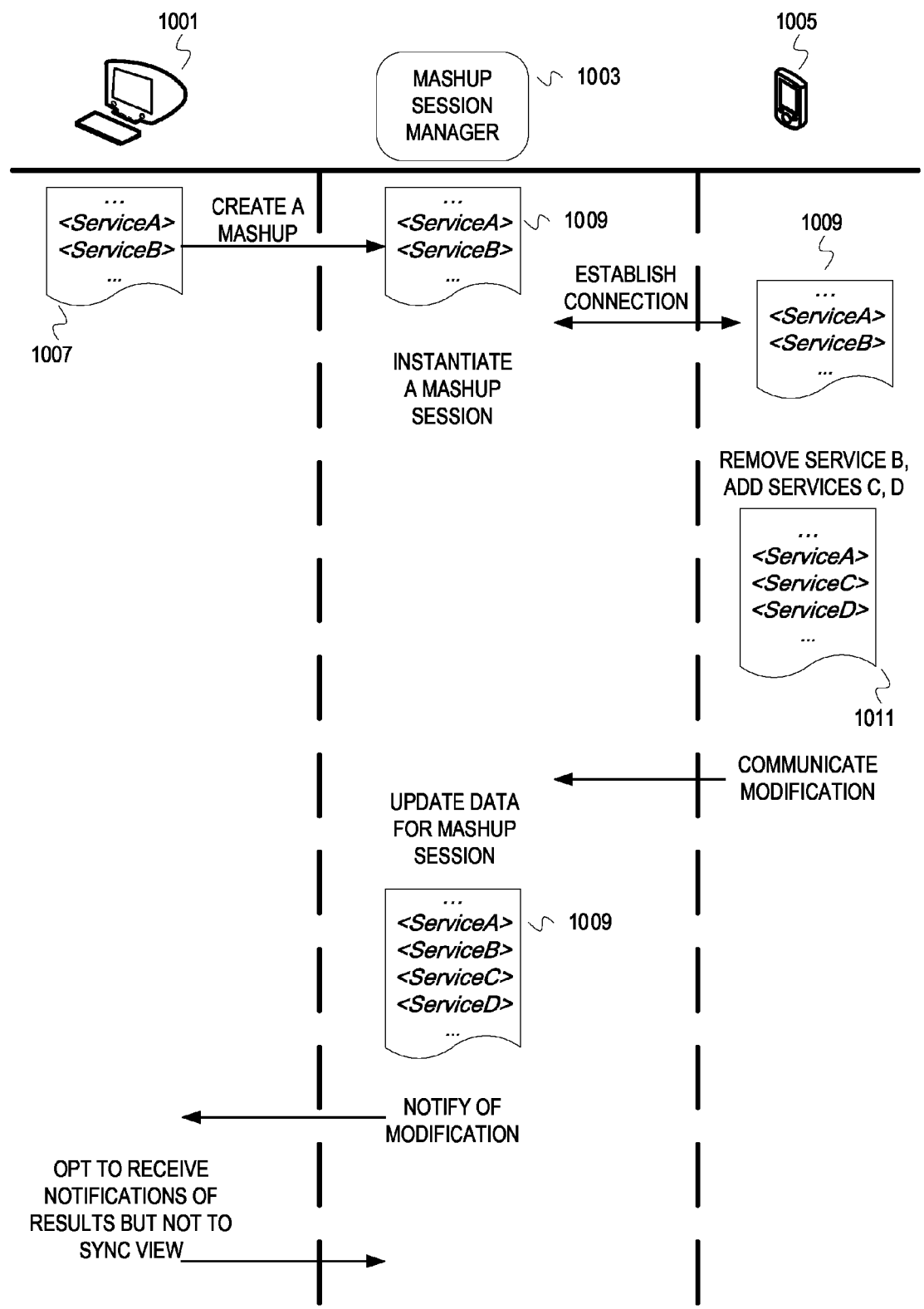
FIG. 10 depicts an example conceptual diagram of asynchronous collaboration with a mashup session shared across different execution environments.

FIG. 10 depicts an example conceptual diagram of asynchronous collaboration with a mashup session shared across different execution environments. FIG. 10 illustrates a computer 1001, a smartphone 1005, and a mashup session manager 1003. For this illustration, the mashup session manager resides on an intermediate device, for example on a server.

The computer 1001 creates a mashup application 1007. As depicted in FIG. 10, creation of the mashup application can involve selecting from a catalog of mashup applications, and possibly modifying a selected mashup application. The mashup application 1007 can also be created with a tool that generates code based on services and functionality selected by a user. In FIG. 10, the computer 1001 creates the mashup 1007 to use a service A and a service B. The created mashup is indicated to the mashup session manager 1003, where mashup code 1009 is created. Embodiments can create the mashup code at the mashup session manager 1001 with data sent from the creating computer 1001 that indicates the services and functionality. Embodiments can also send the mashup code 1007 to the mashup session manager 1003. Embodiments can also create the mashup 1007 at the mashup session manager 1003, instead of at the computer 1001. For instance, the indications of services and functionality can be performed with a user interface at the computer 1001, while the generation of the mashup application code is done at the mashup session manager in response to the indications with the user interface. Embodiments can also generate different degrees of the mashup application code in the difference environments. For example, the mashup session manager can distribute mashup application code that comprises Perl script, DHTML code, and XSQL code. In another example, the mashup session manager can distribute mashup application code that indicates services (e.g., links, names of the data services, etc.), and how the services are wired together or how the services should be wired together. The execution environments can add additional code for presentation functionality (e.g., user interface components), additional code that operates upon data from the services, additional code that filters results from the services, additional code that manipulates input to be submitted to the services, additional code that implements the wiring, etc.

As discussed earlier, creating the mashup session involves adding participants. In accordance with information provided by the computer 1001, the mashup session manager 1003 establishes a connection with the smartphone 1005. Adding the smartphone 1005 as a participant device can comprise any one of sending the mashup code 1009 to the smartphone 1005, communicating a reference (e.g., network location) of the mashup code 1009 to the smartphone 1005, creating a connection for the computer 1001 to communicate the mashup code 1007 to the smartphone 1005, etc. After obtaining sufficient information, the mashup session manager 1003 instantiates the mashup session based upon the mashup code 1009.

After joining the mashup session, the smartphone 1005 modifies the mashup code 1009. The smartphone 1005 removes service B, and adds a service C and a service D, resulting in a mashup code 1011. The smartphone 1005 communicates the modification to the mashup session manager 1003. The mashup session manager 1003 updates the mashup session data accordingly. For instance, the mashup session manager can instantiate a mashup session structure or modify a data structure entry for the participant device 1005 that indicates the mashup code 1011, or at least the modifications. In FIG. 10, the mashup session manager 1003 modifies the mashup code 1009 to use services C, D, which were added by the smartphone 1005.

The mashup session manager 1003 then notifies the computer 1001 of the modifications made at the smartphone 1005. Although the computer's view can be synchronized with the view of the mashup session at the smartphone 1005, the computer 1001 opts to receive notifications of results and/or interactions of other participants (or a particular participant) instead of synchronizing the view of the mashup session. To illustrate, a first user creates a mashup to map restaurant locations within a threshold distance of all participants. So, the mashup utilizes a map service, a restaurant listing service, and global positioning services of the participants' devices. One of the participants may not care about the cuisine, but wants to find a ticket vendor near all participants. This participant modifies the mashup at his/her device to use a map service, the GPS services, and a ticket vendor directory. A third participant may not want to view the map, perhaps to conserve power, and only wishes to see reviews of restaurants returned to the query of the first participant. The mashup session manager can maintain data and code that provides results, or is aware of the results, that map restaurants for the first participant, and that map ticket vendors for the second participant. The mashup session manager can receive interact with the device of the third participant to retrieve restaurant reviews for the third participant for only those restaurants in the result provided to the first participant.

Although FIG. 10 depicts the mashup session manager modifying the mashup 1009 to reflect additions made by the participant device 1005, embodiments are not so limited. Embodiments can maintain each different mashup code for the different participant devices. For example, participant A uses services A and B; participant B uses services A, B, and C; and participants C and D use services A, B, and E. The mashup session manager can maintain separate mashup code for participants A, B, and a single mashup code for participants C and D. In addition to the separate mashup codes, the mashup session manager can also maintain a unifying mashup code that utilizes all of the services. The mashup session manager maintains data and code that allows views of the mashup session to be consistent across participant devices, if desired. And the mashup session manager can notify a first participants of results received/used by a second participant, without homogenizing the views of the mashup session. Embodiments can also allow a participant device to present at least a few if not all of the different views of the mashup session. Using the above illustration, a first participant device can display a first map of restaurants, a second map of ticket vendors, and a listing of the restaurant reviews of the mapped restaurants. Thus, the shared mashup session is flexible enough to allow collaboration of participants across devices in a mashup session with or without synchronization of views.

Furthermore, embodiments are not limited to services provided from websites on the Internet. As discussed above, a mashup can utilize a service of participant devices, such as the global positioning data provided by each device. Mashups can utilize services provided at the server hosting the mashup session manager, services provided by an intranet, etc.

While the embodiments are described with reference to various implementations and exploitations, it will be understood that these embodiments are illustrative and that the scope of the inventive subject matter is not limited to them. In general, techniques for distributing mashups across execution environments as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   establishing a mashup session based, at least in part, on a mashup application and execution environments of participants of the mashup session;
   maintaining state data representative of at least a current view of the mashup session, wherein said maintaining state data representative of at least the current view of the mashup session comprises maintaining at least one of a history of mashup actions performed in the execution environments that affect a state of the mashup session, a history of requests generated responsive to mashup actions performed in the execution environments during the mashup session, history of requests and corresponding parameter values submitted to the mashup application during the mashup session, one or more recent responses to requests submitted during the mashup session, and data generated by the mashup application responsive to actions performed with the mashup application in the execution environments during the mashup session; and
   maintaining consistent views of the mashup session across the execution environments in accordance with the state data.

2. The method of claim 1, wherein said establishing the mashup session based, at least in part, on the mashup application and the execution environments of the participants of the mashup session comprises:
   generating a mashup session identifier; and
   populating a mashup session structure with data that associates the mashup application with the mashup session identifier and that associates indications of the execution environments with the mashup session identifier.

3. The method of claim 2, wherein said establishing the mashup session based, at least in part, on the mashup application and the execution environments of the participants of the mashup session further comprises establishing connection information for the execution environments to communicate data about the mashup session among the execution environments.

4. The method of claim 1,
   wherein said maintaining consistent views of the mashup session across the execution environments in accordance with the state data comprises relaying at least one of an indication of an action performed with the mashup application in a first of the execution environments during the mashup session to the other execution environments and an indication of a response to the action performed with the mashup application in the first of the execution environments to the other execution environments,
   wherein said maintaining the state data representative of at least the current view of the mashup session comprises updating the state data to reflect the action performed with the mashup application in the first of the execution environments.

5. The method of claim 1 further comprising:
   determining an action performed for the mashup application in a first of the execution environments; and
   executing the mashup application in accordance with the action,
   wherein said maintaining the state data representative of at least the current view of the mashup session comprises updating the state data to reflect said executing the mashup application in accordance with the action,
   wherein said maintaining consistent views of the mashup session across the execution environments in accordance with the state data comprises communicating a result generated from said executing the mashup application in accordance with the action to the execution environments.

6. The method of claim 1 wherein said maintaining consistent views of the mashup session across the execution environments in accordance with the state data comprises:
   determining that a view of the mashup session at a first of the execution environments corresponds to a past state of the mashup session; and
   updating the view with the state data.

7. The computer program product of claim 1, wherein the computer readable program code being configured to maintain consistent views of the mashup session across the execution environments in accordance with the state data comprises the computer readable program code being configured to:
   determine that a view of the mashup session at a first of the execution environments corresponds to a past state of the mashup session; and
   update the view with the state data.

8. A computer program product for presenting a multi-user mashup session across execution environments, the computer program product comprising:
   a computer readable storage medium having computer readable program code embodied therewith, the computer readable program code comprising:
   computer readable program code configured to,
   establish a mashup session based, at least in part, on a mashup application and execution environments of participants of the mashup session;
   maintain state data representative of at least a current view of the mashup session, wherein the computer readable program code being configured to maintain state data representative of at least the current view of the mashup session comprises the computer readable program code being configured to maintain at least one of a history of mashup actions performed in the execution environments that affect a state of the mashup session, a history of requests generated responsive to mashup actions performed in the execution environments during the mashup session, history of requests and corresponding parameter values submitted to the mashup application during the mashup session, one or more recent responses to requests submitted during the mashup session, and data generated by the mashup application responsive to actions performed with the mashup application in the execution environments during the mashup session; and maintain consistent views of the mashup session across the execution environments in accordance with the state data.

9. The computer program product of claim 8, wherein the computer readable program code being configured to establish the mashup session based, at least in part, on the mashup application and the execution environments comprises the computer readable program code being configured to:

generate a mashup session identifier; and populate the mashup session state structure data that associates the mashup application with the mashup session identifier and that associates indications of the execution environments with the mashup session identifier.

10. The computer program product of claim 9, wherein the computer readable program code being configured to establish the mashup session based, at least in part, on the mashup application and the execution environments of the participants of the mashup session comprises the computer readable program code being further configured to establish connection information for the execution environments to communicate data about the mashup session among the execution environments.

11. The computer program product of claim 8, wherein the computer readable program code being configured to maintain consistent views of the mashup session across the execution environments in accordance with the state data comprises the computer readable program code being configured to relay at least one of an indication of an action performed with the mashup application in a first of the execution environments during the mashup session to the other execution environments and an indication of a response to the action performed with the mashup application in the first of the execution environments to the other execution environments, wherein the computer readable program code being configured to maintain state data representative of at least a current view of the mashup session comprises the computer readable program code being configured to update the state data to reflect the action performed with the mashup application in the first of the execution environments.

12. The computer program product of claim 8, wherein the computer readable program code is further configured to:

determine an action performed for the mashup application in a first of the execution environments; and execute the mashup application in accordance with the action, wherein the computer readable program code being configured to maintain the state data representative of at least the current view of the mashup session comprises the computer readable program code being configured to update the state data to reflect said executing the mashup application in accordance with the action, wherein the computer readable program code being configured to maintain consistent views of the mashup session across the execution environments in accordance with the state data comprises the computer readable program code being configured to communicate a result generated from said executing the mashup application in accordance with the action to the execution environments.

13. A computer program product for presenting a multi-user mashup session across execution environments, the computer program product comprising:

a computer readable storage medium having computer readable program code embodied therewith, the computer readable program code comprising:

computer readable program code configured to, generate a mashup session identifier for a mashup session based, at least in part on a mashup that uses a first set of services to generate results in response to requests submitted to the mashup;

associate a plurality of participant devices with the mashup session identifier;

establish connections with the plurality of participant devices;

determine that a first of the plurality of participant devices modifies the mashup either to add a service for the mashup to use in conjunction with the first set of services for generating results in response to requests submitted to the modified mashup or to remove one of the first set of services; and maintain state data for the mashup session that represent at least a first current result generated by the mashup from use of the first set of services and that represent at least a second current result generated by the mashup as modified.

14. The computer program product of claim 13, wherein the computer readable program code is further configured to perform one of synchronize views of the mashup session across the plurality of devices to indicate the first current result and the second current result, notify the first participant device of the at least first current result, present separate views of the mashup session that reflect the first current result and the second current result at a second participant device.

15. An apparatus comprising:

a processing unit;

a network interface; and a mashup session manager operable to, establish a mashup session based, at least in part, on a mashup application and execution environments of participants of the mashup session;

maintain state data representative of at least a current view of the mashup session, wherein the mashup session manager being operable to maintain state data representative of at least the current view of the mashup session comprises the mashup session manager being operable to maintain at least one of a history of mashup actions performed in the execution environments that affect a state of the mashup session, a history of requests generated responsive to mashup actions performed in the execution environments during the mashup session, history of requests and corresponding parameter values submitted to the mashup application during the mashup session, one or more recent responses to requests submitted during the mashup session, and data generated by the mashup application responsive to actions performed with the mashup application in the execution environments during the mashup session; and maintain consistent views of the mashup session across the execution environments in accordance with the state data.

16. The apparatus of claim 15, wherein the mashup session manager being operable to establish the mashup session based, at least in part, on the mashup application and the execution environments comprises the mashup session manager being operable to:

generate a mashup session identifier; and populate the mashup session state structure data that associates the mashup application with the mashup session identifier and that associates indications of the execution environments with the mashup session identifier.

17. The apparatus of claim 15, wherein the mashup session manager being operable to establish the mashup session based, at least in part, on the mashup application and the execution environments of the participants of the mashup session comprises the mashup session manager being operable to establish connection information for the execution environments to communicate data about the mashup session among the execution environments.

\* \* \* \* \*